(12) United States Patent
Schönberger et al.

(10) Patent No.: US 10,285,231 B2
(45) Date of Patent: May 7, 2019

(54) SWITCHING REGULATOR FOR OPERATING LUMINAIRES, FEATURING PEAK CURRENT VALUE CONTROLLING AND MEAN CURRENT VALUE DETECTION

(71) Applicant: TRIDONIC GMBH & CO KG, Dornbirn (AT)

(72) Inventors: John Schönberger, Reichenburg (CH); Thomas Dumka, Altach (AT); Andre Mitterbacher, Dornbirn (AT); Lukas Saccavini, Dornbirn (AT)

(73) Assignee: TRICONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 15/547,644

(22) PCT Filed: Feb. 4, 2016

(86) PCT No.: PCT/EP2016/052411
§ 371 (c)(1),
(2) Date: Jul. 31, 2017

(87) PCT Pub. No.: WO2016/134945
PCT Pub. Date: Sep. 1, 2016

(65) Prior Publication Data
US 2018/0063910 A1    Mar. 1, 2018

(30) Foreign Application Priority Data

Feb. 24, 2015  (DE) .................. 10 2015 203 249
Nov. 30, 2015  (DE) .................. 10 2015 223 723

(51) Int. Cl.
*H05B 33/08*      (2006.01)
*H02M 1/08*       (2006.01)
(Continued)

(52) U.S. Cl.
CPC .......... *H05B 33/0818* (2013.01); *H02M 1/08* (2013.01); *H02M 3/156* (2013.01); *H05B 33/0851* (2013.01); *H02M 2001/0009* (2013.01)

(58) Field of Classification Search
CPC ................ H05B 33/08; H05B 33/0815; H05B 33/0818; H05B 33/0851; H05B 37/02;
(Continued)

(56) References Cited

U.S. PATENT DOCUMENTS 7,071,762 B2 *  7/2006  Xu ..................... H05B 33/0815
                                                                   315/224
9,655,182 B2    5/2017  Lochmann et al.
(Continued)

FOREIGN PATENT DOCUMENTS

DE      10 2011 10012      10/2012
DE      11 2010 004983     1/2013
(Continued)

OTHER PUBLICATIONS

German search report in priority co-pending German Application 10 2015 203 249.3 dated Oct. 27, 2015.
(Continued)

*Primary Examiner* — Thai Pham
(74) *Attorney, Agent, or Firm* — Andrus Intellectual Property Law

(57) ABSTRACT

The invention relates to a switching regulator for operating luminaires, comprising a control circuit (4). The control circuit (4) is designed to operate, by triggering the switch (5) that is coupled to a coil, the switching regulator (3) in a limit mode of operation when the load generated by the luminaire (2) is so high that the resulting switching-off threshold exceeds a predefined minimum switching-off value, and operate the switching regulator in a discontinuous mode of
(Continued)

operation at the minimum switching-off value when the load generated by the luminaire (2) is so low that the switching-off threshold in a limit mode of operation would lie below the predefined minimum switching-off value. The signal representing the current is fed to the control circuit (4) in both the limit mode of operation and the discontinuous mode of operation without being subjected to any external mean value generation.

22 Claims, 8 Drawing Sheets

(51) Int. Cl.
*H02M 3/156* (2006.01)
*H02M 1/00* (2006.01)

(58) Field of Classification Search
CPC .... H02M 1/08; H02M 3/156; H02M 2001/00; H02M 2001/0009
See application file for complete search history.

(56) References Cited

U.S. PATENT DOCUMENTS

| | | | |
|---|---|---|---|
| 2002/0180411 A1 | 12/2002 | Bub et al. | |
| 2008/0278086 A1 | 11/2008 | Chitta et al. | |
| 2011/0057576 A1* | 3/2011 | Otake | H05B 33/0803 315/291 |
| 2011/0140621 A1* | 6/2011 | Yi | H05B 33/0854 315/224 |
| 2012/0133295 A1 | 5/2012 | Pereira et al. | |
| 2012/0262087 A1* | 10/2012 | Watanabe | H05B 33/0815 315/291 |
| 2012/0286686 A1* | 11/2012 | Watanabe | H05B 33/0815 315/224 |
| 2014/0035476 A1 | 2/2014 | Hwang et al. | |
| 2014/0125247 A1 | 5/2014 | Mitterbacher | |
| 2015/0042237 A1 | 2/2015 | Huber | |
| 2015/0054421 A1 | 2/2015 | Auer et al. | |
| 2015/0077003 A1 | 3/2015 | Vonach et al. | |
| 2016/0204700 A1 | 7/2016 | Mayer et al. | |
| 2018/0153010 A1 | 5/2018 | Mitterbacher | |

FOREIGN PATENT DOCUMENTS

| | | |
|---|---|---|
| DE | 10 2011 088 966 | 6/2013 |
| DE | 10 2012 007 479 | 10/2013 |
| DE | 10 2013 207038 | 5/2014 |
| DE | 10 2013 216877 | 2/2015 |
| EP | 1835605 | 9/2007 |
| EP | 2 341 760 | 7/2011 |
| EP | 2 512 208 | 10/2012 |
| WO | 2007135454 | 11/2007 |
| WO | 2010118944 | 10/2010 |
| WO | 2013092734 | 6/2013 |
| WO | 2013152368 | 10/2013 |
| WO | 2012167294 | 12/2013 |
| WO | 2014176609 | 11/2014 |

OTHER PUBLICATIONS

German search report in priority co-pending German Application 10 2015 223 723.0 dated Nov. 9, 2016.
PCT Search Report in parent PCT Application PCT/EP2016/052411 dated Jul. 21, 2016.
Liu, Sheng, et al., An Adaptive On-Time Controlled Boost LED Driver with High Dimming Ratio, IECON 2012—38th Annual Conference on IEEE Industrial Electronics Society, vol., no., pp. 210, 214, Oct. 25-28, 2012.

* cited by examiner

SWITCHING REGULATOR FOR OPERATING LUMINAIRES, FEATURING PEAK CURRENT VALUE CONTROLLING AND MEAN CURRENT VALUE DETECTION

CROSS REFERENCE TO RELATED APPLICATION

The present application is the U.S. national stage application of International Application PCT/EP2016/052411, filed Feb. 4, 2016, which international application was published on Sep. 1, 2016 as International Publication WO 2016/134945 A1. The International Application claims priority to German Patent Applications 10 2015 203 249.3 filed Feb. 24, 2015, and 10 2015 223 723.0 filed Nov. 30, 2015.

FIELD OF THE INVENTION

The present invention relates to a switching regulator for operating lamps and a method for controlling such a switching regulator. The invention relates in particular to switching regulators used in operating devices for supplying power to one or more light emitting diodes.

BACKGROUND OF THE INVENTION

An operating device for supplying one or more light emitting diodes is known from WO 2013/152368 A1. Such operating devices are primarily used for providing a desired power supply for the lamp, e.g. a light emitting diode (LED) or numerous light emitting diodes connected in series and/or in parallel. Additional functions, such as dimming the lamp, changing/adapting the luminous color, or compensation for fluctuations in the input voltage, may be provided in the operating device.

The light emission of a light emitting diode depends on the current flow through the light emitting diode. To control or regulate the brightness, light emitting diodes are thus operated in a mode in which the current flow through the light emitting diode is controlled or regulated by the operating device.

Switching regulators can be used to activate light emitting diodes, e.g. step-up converters or step-down converters, also referred to in the field as boost converters or buck converters, respectively. In a switching regulator of this type, a control device activates a quick switch, which causes current to flow through a coil (as well as through the light emitting diode, with a buck converter) when it is switched on. After switching it off, the coil continues to drive the current (in the case of a buck converter) through the light emitting diode.

A number of measurement values are determined by the control circuit of the switching regulator for control or regulation, in order to counteract deviations from predefined operating parameters, such as luminous color and brightness, or shifts in the light spectrum at different dimming levels.

For the determination of the measurement values and the generation of corresponding signals, which can be supplied to and processed by the control circuit, additional components/circuits are needed, making the overall construction of the switching regulator complex and expensive.

Depending on the application, the switching regulator is operated in a continuous operating mode, in which the switch is switched back on before the current through the coil has decreased to zero, in a limit operating mode, in which the switch is switched back on as soon as the coil current has decreased to zero or the zero line has been reached by a positive side, or in a discontinuous operating mode, in which the switch is not immediately switched on again as soon as the coil current has decreased to zero or the zero line has been reached with a positive side.

In the continuous operating mode (gap-less operation) and in the limit operating mode, a change in the power output of the switching regulator can take place very easily via a change in the threshold value of the coil current at which the switch is switched off. Problems may arise, however, with low dimming levels or low output currents to the light emitting diodes.

Thus an arbitrary decreasing of the switching-off threshold in the limit operating mode is frequently not possible, because problems may arise with low thresholds regarding the detection and processing of the low current value. Furthermore, a large coil is needed for the continuous operating mode for low output currents, making the converter expensive, and increasing its dimensions.

Sheng Liu et al.: "An Adaptive On-Time Controlled Boost LED Driver with High Dimming Ratio," IECON 2012—$38^{th}$ Annual Conference on IEEE Industrial Electronics Society, vol., no., pp. 210, 214, Oct. 25-28, 2012, describes an operating device for light emitting diodes that functions with pulse modulation in a continuous operating mode with high load requirements or marginal dimming, and in a discontinuous operating mode with low load requirements or greater dimming. A precise control/regulation of the brightness is also possible with low load requirements with this operating device, or boost converter. It is also not necessary to have a large coil for low output currents.

However, in order to control the switching between the operating modes, and in order to implement the pulse frequency modulation, additional components/circuits are needed with the operating device described therein, making the overall construction of the operating device complex and expensive.

SUMMARY OF THE INVENTION

The object of the invention is to provide devices and methods that minimize the problems described above. In particular, the objective is to provide a switching regulator, an operating device, and a method for controlling a switching regulator for the operation of one or more lamps, which enable a precise control and regulation with a simple and cost-effective construction.

According to the present invention, a switching regulator, in particular, e.g., a step-down converter, for operating one or more lamps, comprises a control circuit, which activates a switch of the switching regulator coupled to a coil, and means for direct or indirect detection of the current flowing through the coil, and for supplying a signal representing this current to the control circuit. The switch is switched off when the signal indicates that the current has reached a switching-off threshold. The control circuit is configured to operate the switching regulator in a limit operating mode by activating the switch when the load formed by the one or more lamps is so high that the resulting switching-off threshold lies above a predefined minimum value for the switching-off threshold, and to operate in a discontinuous operating mode at the minimum value of the switching-off threshold when the load formed by the one or more lamps is so low that the resulting switching-off threshold in a limit operating mode would lie below the predefined minimum value of the switching-off threshold, wherein the signal is supplied to the control circuit in both the case of the limit operating mode as well as in the case of the discontinuous operating mode, without being subjected to an external averaging. I.e. the control circuit is configured such that it activates a switch on the basis of the signal, representing the current, that has been supplied, both in the limit operating mode as well as in the discontinuous mode.

Thus, the switching regulator can be operated with a higher load in the limit operating mode, allowing for a simple and precise control of the current passing through the one or more lamps by modifying the switching-off threshold. If the maximum value of the current through the one or more lamps, or the switching-off threshold decreases due to different load requirements such as dimming, to a value that is so low that a further reduction would lead to problems regarding the detection, processing, etc. of this low current value, a change to a discontinuous operating mode takes place, in which the actuating variable is represented only by the down time of the current.

According to the present invention, a switching regulator for operating one or more lamps comprises a control circuit that activates a switch of the switching regulator coupled to a coil, and means for the direct or indirect detection of the current flowing through the coil, and for supplying a signal representing this current to the control circuit, wherein the switch is switched off when the signal indicates that the current has reached a switching-off threshold. The control circuit is configured to operate the switching regulator in a limit operating mode by means of activating the switch when the load formed by the one or more lamps is so high that the resulting switching-off threshold lies above a minimum value, and to operate in a discontinuous operating mode at the minimum value of the switching-off threshold, alternating with the limit operating mode, when the load formed by the one or more lamps is so high that the resulting switching-off threshold in a limit operating mode would lie below the predefined minimum value of the switching-off threshold. The signal representing the current can be supplied to the control circuit in both the limit operating mode as well as the discontinuous operating mode, without being subjected to an external averaging.

With the discontinuous operating mode, the re-activation may be delayed, and thus the average current may be lower than desired, when the point in time at which it is switched on again is a function of the voltage curve (zero crossing or voltage minimum) through the switch, in addition to the load requirements/dimming level.

By alternating between the discontinuous operating mode and the limit operating mode, this can be compensated for, in particular in a transition region, by the increased current mean value in the subsequent limit operating mode.

The control circuit can be configured to switch from the mode in which the switching regulator is operated in the discontinuous operating mode at the minimum value of the switching-off threshold alternating with the limit operating mode, to a mode in which the switching regulator is operated in the discontinuous operating mode at the minimum value of the switching-off threshold, and not alternating with the limit operating mode, when a first control signal is received by the control circuit, or when the time segment $T_{Period}$ in which the control circuit switches the switch on, off, and back on, assumes a maximum value.

The control circuit can be configured to switch from the mode in which the switching controller is operated in the discontinuous operating mode at the minimum value of the switching-off threshold, not alternating with the limit operating mode, to the mode in which the switching controller is operated in the discontinuous operating mode at the minimum value of the switching-off threshold, alternating with the limit operating mode, when a second control signal is received by the control circuit, or when the time segment $T_{Period}$ in which the control circuit switches the switch on, off, and back on, assumes a minimum value.

The one or more lamps can be light emitting diodes.

The control circuit can comprise a comparator for comparing the signal with a signal representing the minimum value.

The control circuit can be configured to change the switching-off threshold in accordance with a received dimming signal when in the limit operating mode.

The control circuit can be configured to determine a current mean value $I_{avg}$ in the discontinuous operating mode for the time segment $T_{Period}$ in which the control circuit switches the switch on, off and back on, corresponding to the equation: $I_{avg}=0.5*I_{Peak}*T_{Active}/T_{Period}$, and to determine the point in time for switching the switch back on based on the determined current mean value $I_{avg}$, wherein $I_{Peak}$ is the predefined minimum value for the switching-off threshold, and $T_{Active}$ is the sum of the on time $T_{On}$ and the off time $T_{Off}$ of the switch. Thus, additional circuitry for determining the current mean value and an additional input (Pin) on the control circuit for inputting the externally determined current mean value are not needed.

The control circuit can be configured to continuously determine the current mean value $I_{avg}$ in the discontinuous operating mode according to the off time $T_{Off}$ of the switch up to a point in time in which the switch is switched on again, and to continuously compare the determined current mean value $I_{avg}$ with a value corresponding to the dimming signal, in order to determine the point in time at which it is switched on again.

The control circuit can be configured to detect a signal representing the voltage curve over the switch, and to determine the point in time at which it is switched on again in the discontinuous operating mode based on the determined current mean value $I_{avg}$.

According to the present invention, a switching regulator for operating one or more lamps comprises a control circuit that is configured to operate the switching regulator in a discontinuous operating mode by activating a switch coupled to a coil, means for direct or indirect detection of the current flowing through the coil, and for supplying a signal representing this current to the control circuit, and means for direct or indirect detection of the current output by the switching regulator and flowing through the one or more lamps or the voltage output to the one or more lamps, and for supplying a second signal representing this current or voltage to the control circuit, wherein the control circuit is configured to switch the switch off when the first signal indicates that the current has reached a switching-off threshold, to regulate the switching back on point in time of the switch on the basis of the second signal, and to increase the amplification factor of the regulating loop for the switching back on point in time in a timespan in which the switch is switched off that increases in successive switching cycles.

The control circuit can be configured to change the switching on point in time of the switch and/or the switching-off threshold as a function of a received dimming signal, wherein the second signal is compared in the regulating loop as a regulating value with a received dimming signal, and the amplification factor for the regulation deviation can be increased when the timespan increases.

According to the present invention, a switching regulator for operating one or more lamps comprises a control circuit that is configured to operate the switching regulator in a discontinuous operating mode by means of activating a switch coupled to a coil, means for direct or indirect detection of the current flowing through the coil and for supplying a first signal representing this current to the control circuit, and means for direct or indirect detection of the current output by the switching regulator and flowing through the one or more lamps, or the voltage output to the one or more lamps and for supplying a second signal representing this current or voltage to the control circuit, wherein the control circuit is configured to switch the switch off when the first signal indicates that the current has reached a switching-off threshold, to change the switching-off threshold depending on a received dimming signal, and to regulate the switching back on point in time of the switch on the basis of the second signal.

The control circuit can be configured to set the switching-off threshold in accordance with a function or a table, which assigns each value of the received dimming signal to a switching-off threshold.

The control circuit can be configured to change the switching back on point in time of the switch depending on a received dimming signal.

The control circuit can be configured to change the switching back on point in time of the switch at a constant switching-off threshold when the received dimming signal has changed, up to a specific value of the received dimming signal, and to change the switching-off threshold below the specific value when the off timespan of the switch, or the time segment in which the current through the coil decreases to zero and the switch is switched back on again, remains constant.

The switching regulator can be a step-down or step-up converter.

According to the present invention, an operating device for light emitting diodes comprises one of the switching regulators described above.

According to the present invention, a method for controlling a switching regulator for the operation of one or more lamps comprises steps for activating a switch of the switching regulator coupled to a coil, detecting the current flowing through the coil, and generating a signal representing this current, wherein the switch is switched off when the signal indicates that the current has reached a switching-off threshold. By activating the switch, the switching regulator is operating in a limit operating mode, when the load formed by the one or more lamps is so high that the resulting switching-off threshold lies above a predefined minimum value for the switching-off threshold, and to operate in a discontinuous operating mode at the minimum value of the switching-off threshold alternating with the limit operating mode when the load formed by the one or more lamps is so low that the resulting switching-off threshold in a limit operating mode would lie below the predefined minimum value of the switching-off threshold.

According to the present invention, a method for controlling a switching regulator for the operation of one or more lamps comprises the steps for activating a switch of the switching regulator coupled to a coil in a discontinuous operating mode, detecting the current flowing through the coil, and generating a first signal representing this current, and detecting the current output by the switching regulator and flowing through the one or more lamps, or the voltage output to the one or more lamps, and generating a second signal representing this current or voltage, wherein the switch is switched off when the first signal indicates that the current has reached a switching-off threshold, the switching back on point in time of the switch is regulated on the basis of the second signal, and the amplification factor of the regulating loop is increased for the switching back on point in time with a timespan in which the switch is switched off increases in successive switching cycles.

According to the present invention, a method for controlling a switching regulator for the operation of one or more lamps comprises the steps for activating a switch of the switching regulator coupled to a coil in a discontinuous operating mode, detecting the current flowing through the coil and generating a first signal representing this current, and detecting the current output by the switching regulator and flowing through the one or more lamps or the voltage output to the one or more lamps, and generating a second signal representing this current or voltage, wherein the switch is switched off when the first signal indicates that the current has reached a switching-off threshold, the switching-off threshold is changed depending on a received dimming signal, and the switching back on point in time of the switch is regulated on the basis of the second signal.

BRIEF DESCRIPTION OF THE DRAWINGS

The invention shall be explained in greater detail below based on the attached drawings. Therein.

Components having identical functions are indicated with identical reference symbols in the Figures.

DETAILED DESCRIPTION

Figure 1:
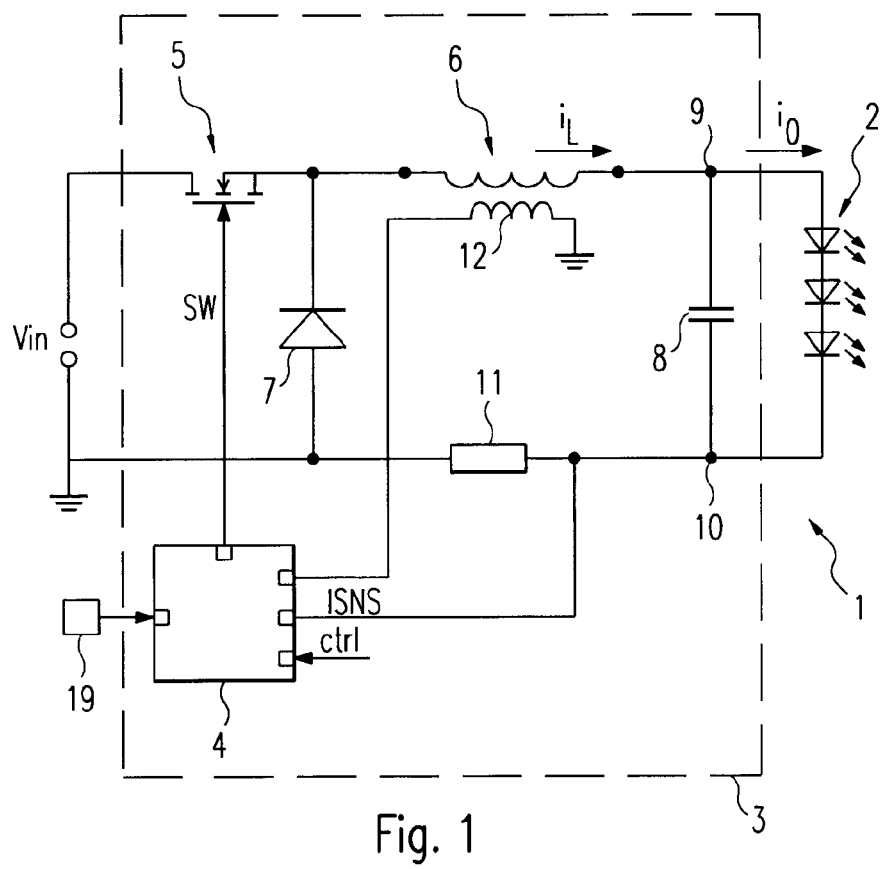
FIG. 1 shows a circuit of an operating device for light emitting diodes according to a first exemplary embodiment in accordance with the present invention.

FIG. 1 shows a circuit of an operating device 1 for lamps 2 according to a first exemplary embodiment in accordance with the present invention, comprising a switching regulator 3 having a control circuit 4 and a step-down converter serving as a converter. The lamp 2 can comprise a light emitting diode (LED) or numerous LEDs. The numerous LEDs can be connected in series or in parallel. The numerous LEDs can also be connected in more complex assemblies, e.g. in numerous series connections connected in parallel to one another. Although three LEDs are depicted by way of example, the lamp can also comprise only one LED, two LEDs or more than three LEDs.

The operating device 1, operating circuit, serves to operate the at least one LED 2. The operating device 1 is supplied with a supply voltage Vin, which can be a direct current voltage or a rectified alternating current voltage. The operating device 1 can comprise a power factor corrector circuit, which provides the supply voltage Vin (not shown).

The controllable switch 5 and the coil 6 are connected in series between the input and output of the switching regulator. When the at least one LED 2 is connected to the switching regulator 3, the controllable switch 5, the coil 6, and the at least one LED 2 are connected in series. A diode 7 is connected in parallel to the at least one LED 2 and the coil 6. A capacitor 8 can be connected in parallel to the output connections 9, 10, such that the capacitor 8 is connected in parallel to the at least one LED 2. The capacitor 8 is an optional element of the circuit shown here. The capacitor 8 can be omitted in other exemplary embodiments.

The controllable switch 5 can be a circuit breaker. The controllable switch 5 can be a field effect transistor or a bipolar transistor. The controllable switch 5 can be a transistor with insulated gate electrodes.

The control circuit 4 can operate the switch 5 of the switching regulator 3, configured as a step-down converter, in a pulsed mode, such that an output current is provided in the form of pulse bundles. By way of example, pulse bundles can be generated at lower dimming levels, in order to set the mean current strengths, and thus the brightness perceived by the eye.

The control circuit 4 can be an integrated semiconductor circuit or comprise an integrated semiconductor circuit. The control circuit 4 can be configured as a processor, a microprocessor, a controller, a microcontroller, or an application specific integrated circuit (ASIC), or a combination of these units.

When the controllable switch 5 is switched on, a current $i_L$ flows through the LED(s) 2 and through the coil 6, which is magnetized as a result. The coil 6 is consequently charged with electrical energy. The diode 7 is blocked in this state. After the controllable switch 5 is switched off, the coil 5 drives the current $i_L$ flowing through it through the LED(s) 2 and the diode 7. The energy stored in the magnetic field of the coil 6 is discharged. Parallel thereto, the capacitor 8 can be charged at the start of when the controllable switch 5 is switched on. In the phase when the controllable switch 5 is switched off, the so-called free-wheeling phase, the capacitor 8 can be discharged, and contributes to the current flow through the LED(s) 2. With an appropriate dimensioning of the capacitor 8, this can lead to a smoothing of the current flowing through the LED(s) 2.

The active coil current $i_L$ can be detected during the switched on phase by means of the voltage decreasing via a measuring resistor 11. The active coil current $i_L$ can be supplied to the control circuit 4 and monitored, in particular during the switched off phase, with a further inductor 12, which is magnetically coupled to the coil 6. Alternatively, there may be a current measuring transformer (not shown) for detecting the active coil current $i_L$, which is disposed in series to the coil 6.

The control circuit 4 compares the active coil current $i_L$, or the voltage ISNS decreasing at the resistor 11 that represents the coil current $i_L$, with an upper switching threshold value $I_{Peak}$ and causes a switching off of the switch 5 when the coil current $i_L$ reaches the upper switching threshold value $I_{Peak}$ (switching-off point). For switching the switch 5 back on, the control circuit 4 compares the active coil current $i_L$ with a lower switching threshold value $I_{low}$, and causes the switch 5 to be switched on when the coil current $i_L$ reaches the lower switching threshold value $I_{low}$, in particular when the increasing coil current $i_L$ reaches a rising side of the coil current $i_L$, the lower switching threshold value $I_{low}$ (low/high transition).

The upper and/or lower switching threshold values $I_{Peak}$, $I_{low}$ can be generated internally by the control circuit 4, or can be provided by an external signal source 19.

In one possible embodiment, it can be determined, through the monitoring via the further inductor 12, when the coil current $i_L$ has dropped to zero during the discharge phase (switched off phase) (and the coil 6 is thus demagnetized). In this case, the lower switching threshold value $I_{low}$ would equal zero. The control circuit 4 can issue a signal sw for activating the controllable switch 5.

The control circuit 4 can receive a command ctrl determining the dimming level at an interface. Alternatively or additionally, the operating circuit 1 can be configured to determine the dimming level depending on at least one sensor signal. By way of example, an actual brightness can be detected by a sensor for regulating a brightness, and a dimming level can be determined depending on a comparison of the actual brightness and the target brightness. Alternatively or additionally, the control circuit 4 can be configured to determine a dimming level depending on an actuation of an actuating element (not shown), e.g. a button, knob or switch.

The control circuit 4 is configured to operate the step-down converter in a limit operating mode by means of activating the switch 5 when the load formed by the LED(s) 2 is so high that the resulting switching-off threshold lies above a predefined minimum value of the switching-off threshold, and to operate in a discontinuous operating mode at the minimum value of the switching-off threshold when the load formed by the LED(s) 2 is so low that the resulting switching-off threshold in a limit operating mode would lie below the predefined minimum value of the switching-off threshold.

Figure 2:
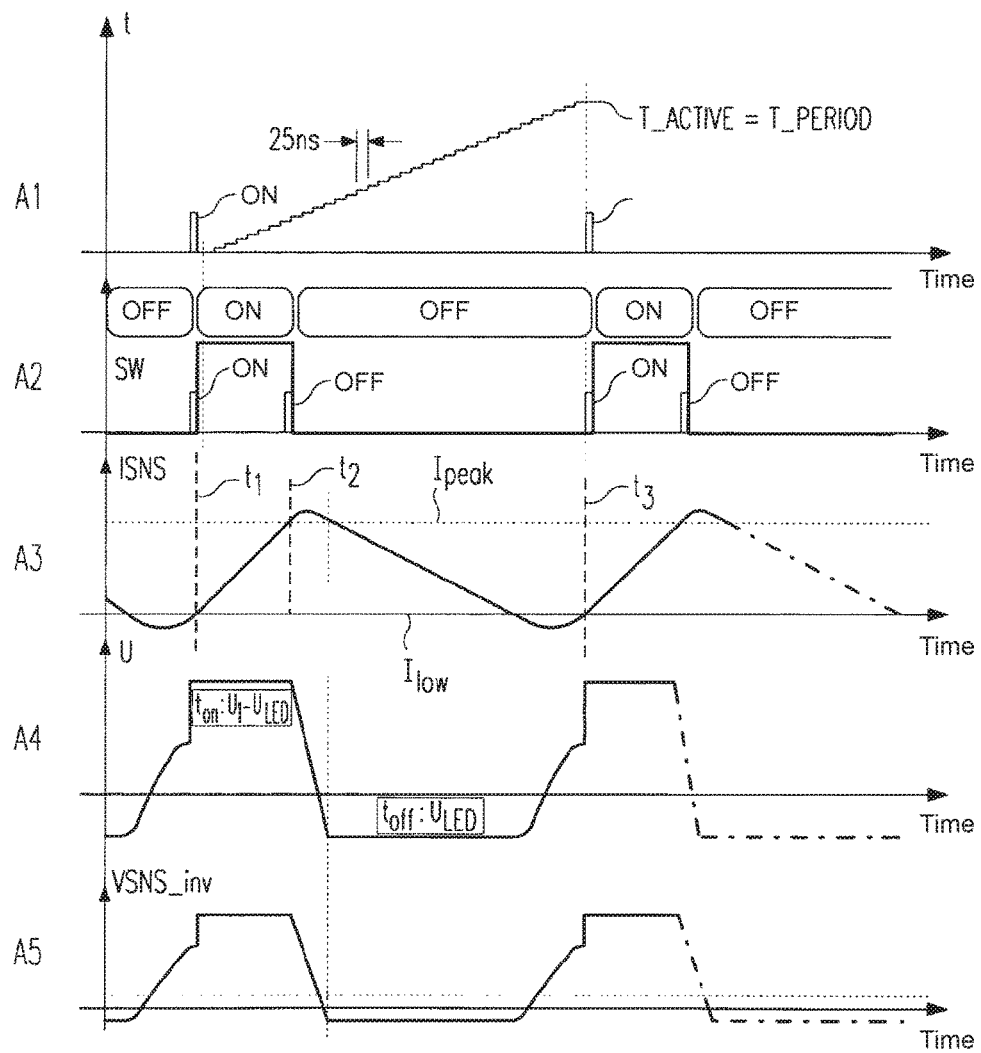
FIG. 2 shows diagrams with signal curves of the switching regulator operated in the limit operating mode, according to an exemplary embodiment in accordance with the present invention.

FIG. 2 shows signal curves of the switching regulator 3 operated in the limit operating mode. Diagram A1 shows the temporal curve of a switched on and switched off cycle, or the temporal detection thereof by the control circuit 4. Diagram A2 shows the switching-on and -off impulses generated by the control circuit 4, and the resulting signal sw issued by the control circuit 4 for activating the controllable switch 5. Diagram A3 shows the temporal curve of the signal ISNS, which represents the current flowing through the LED(s), and which is generated by means of the resistor 11 and is supplied to the control circuit 4.

As can be seen in diagrams A2 and A3, the control circuit 4 generates a switching-on impulse when the rising signal ISNS reaches the lower switching threshold value $I_{low}$ (low/high transition) (time $t_1$). The signal sw for activating the switch changes from a switching-off signal to a switching-on signal. When the rising side of the signal ISNS reaches the upper switching threshold value $I_{Peak}$ (time $t_2$), the control circuit 4 generates the switching-off impulse, the signal sw for activating the switch changes from a switching-on signal to a switching-off signal. The period of the signal ISNS ($T_{Period}$) corresponds to the sum ($T_{Active}$) of the switched on period $T_{On}$ and the switched off period $T_{Off}$ of the switch 5 (timespan from $t_1$ to $t_3$).

The resulting mean value of the current during the zigzag shaped temporal curve of the signal ISNS represents a value to be controlled or determined by the control circuit 4. The current mean value $I_{avg}$ can be determined according to the equation:

$$I_{avg} = 0.5 * I_{Peak} \quad (1)$$

The control circuit 4 controls the desired mean value of the current through the LED(s) 2 according to the equation (1) by means of a modification of the upper switching-off threshold $I_{Peak}$ and depending on a predefined target mean value.

The upper switching-off threshold $I_{Peak}$ (switching off threshold) cannot, however, be arbitrarily reduced, because problems regarding the detection and processing of the current value may arise with low current values.

According to the present invention, the control circuit 4 changes from the limit operating mode to the discontinuous operating mode when the switching-off threshold $I_{Peak}$ would lie below a predefined minimum value when it is reduced.

Figure 3:
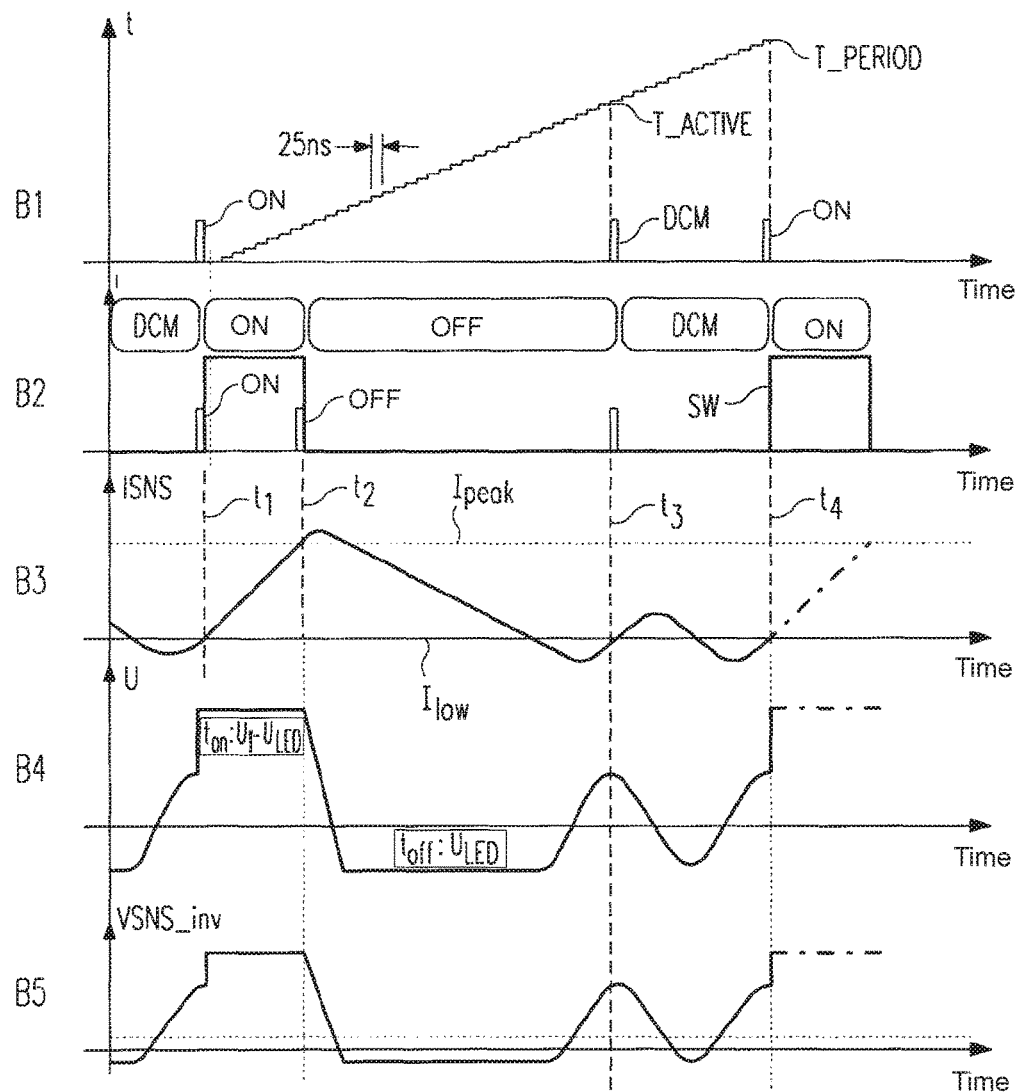
FIG. 3 shows diagrams with signal curves of the switching regulator operated in a discontinuous operating mode, according to an exemplary embodiment in accordance with the present invention.

FIG. 3 shows signal curves of the switching regulator 3 operated in a discontinuous operating mode. Diagram B1 shows the temporal curve of the gapped operation, or its temporal detection by the control circuit 4, respectively. Diagram B2 shows the on and off switching impulses generated by the control circuit 4, and the resulting signal sw issued by the control circuit 4 for activating the controllable switch 5. Diagram B3 illustrates the temporal curve of the signal ISNS, which represents the current flowing through the LED(s), and which is generated by means of the resistor 11 and is supplied to the control circuit 4.

The switching-off threshold $I_{Peak}$ in Diagram B3 corresponds to the predefined minimum value. A change in the current mean value $I_{avg}$ controls the control circuit 4 via a corresponding change in the length of the time interval $t_3$ to $t_4$.

The current mean value Iavg that is to be controlled can be determined in the discontinuous operating mode according to the equation:

$$Iavg = 0.5 * IPeak * TActive / TPeriod \quad (2)$$

wherein IPeak is the predefined minimum value of the switching-off threshold here, TActive is the sum of the switched on period TOn and the switched off period TOff of the switch 5 (timespan from t1 to t3), and TPeriod is the period of the signal ISNS (timespan from t1 to t4). The control circuit 4 controls the desired mean value of the current through the LED(s) 2 according to the equation (2) by means of a change in the length of the timespan t3 to t4.

As is shown in FIG. 3, the control circuit 4 switches the switch 5 on at time $t_1$ and switches the switch 5 off at time $t_2$, at which the signal ISNS reaches the upper switching threshold value $I_{Peak}$. A counter for determining $T_{Active}$ and $T_{Period}$, or separate counters for determining these values, can be initiated at time $t_1$. The current mean value $I_{avg}$ at time $t_3$ can be determined by the control circuit 4 by means of the equation (1). If the rising side of the signal ISNS reaches the lower switching threshold value $I_{low}$ (time $t_3$), $T_{Active}$ is determined by reading the counter. Starting at $t_3$, the active current mean value $I_{avg}$ can be determined continuously with the equation (2), wherein the term $0.5*I_{Peak}*T_{Active}$ of the equation (2) is known, and $T_{Period}$ is determined by reading the counter, and inserted into the equation (2). If the predefined current mean value $I_{avg}$ is reached (time $t_4$), the control circuit 4 switches the switch 5 back on. The cycle described herein begins anew. Alternatively, the switching back on point in time $t_4$ (corresponding to $T_{period}$) can be determined with the equation (2) starting at time $t_3$.

According to the present invention, no external determination of the current mean value $I_{avg}$ takes place in the illustrated exemplary embodiment, in neither the limit operating mode nor the discontinuous operating mode. Only a connection/input (Pin) is needed on the control circuit 4 for detecting the signal ISNS, or for detecting the current flow through the LED(s) 2. The number of connections on the control circuit 4 for a detection of the measured values can thus be reduced. The current mean value $I_{avg}$ is determined by the control circuit 4 in both the limit operating mode as well as in the discontinuous operating mode by means of the signal ISNS. No additional components/circuits are needed for this, simplifying the construction of the step-down converter 3, and making it less expensive.

As is shown in FIG. 3, oscillations in the current may occur after the switching off at time $t_3$, caused by a resonance circuit formed by the coil 6, the capacitor 8 and other capacitors (not shown). The oscillations of the current through the coil 5 can be recorded by means of the signal ISNS or by means of a detection coil 12 inductively coupled to the coil 6, and detected by the control circuit 4.

In order to avoid switching losses of the switch 5, such oscillations should be taken into account in selecting the switching back on point in time, or the switching back on point in time should be selected such that at the switching back on point in time, the voltage oscillations through the switch 5 indicate a voltage minimum. This means, however, that the switching back on of the switch 5 starting at time $t_3$ cannot take place at an arbitrary point in time, but rather only in discrete time intervals, specifically always when the voltage oscillations through the switch 5 indicate a voltage minimum.

If the switch 5 is not switched back on at the point in time determined by the control circuit 4 according to equation (2) due to voltage oscillations, but instead, is switched back on at a later point in time, the predefined current mean value $I_{avg}$ is not reached precisely, and is lower, for example.

According to the present invention, a change from the discontinuous operating mode and the limit operating mode takes place when the load formed by the LED(s) is so low that the resulting upper switching-off threshold $I_{Peak}$ in a limit operating mode would lie below the predefined minimum value for the switching-off threshold $I_{Peak}$.

This alternating can lead, in particular in a transition region, to a more precise current mean value $I_{avg}$ over two periods $T_{Period}$, because the too low current mean value $I_{avg}$ resulting form the discontinuous operating mode can be compensated for by the too high current mean value $I_{avg}$ in the subsequent limit operating mode. This aspect of the alternating from the discontinuous operating mode and the limit operating mode represents in and of itself an advantageous aspect of the present invention. The signal ISNS is nevertheless supplied to the control circuit in both the limit operating mode as well as the discontinuous operating mode, without being subjected to an external averaging.

The end of the alternating operation, or the transition from the alternating operation to a sustained discontinuous operating mode can be triggered by means of a received control signal, or it can be a function of the length of the time segment $t_3$ to $t_4$, or the length of the period $T_{Period}$ of the discontinuous operating mode, wherein an end of an alternating operation, or the transition from the alternating operation to a sustained discontinuous operating mode, takes place when the length assumes a maximum value. The change to the mixed operation takes place in each case after a few switching cycles.

In the same manner, a transition from a sustained discontinuous operating mode to the alternating operation can be triggered by means of a received control signal, or it can be a function of the length of the period $T_{Period}$ of the discontinuous operating mode, wherein a starting of an alternating operation, or the transition from a sustained discontinuous operating mode to the alternating operation takes place when the length assumes a minimum value. The minimum value and the maximum value can be equal.

Figure 4:
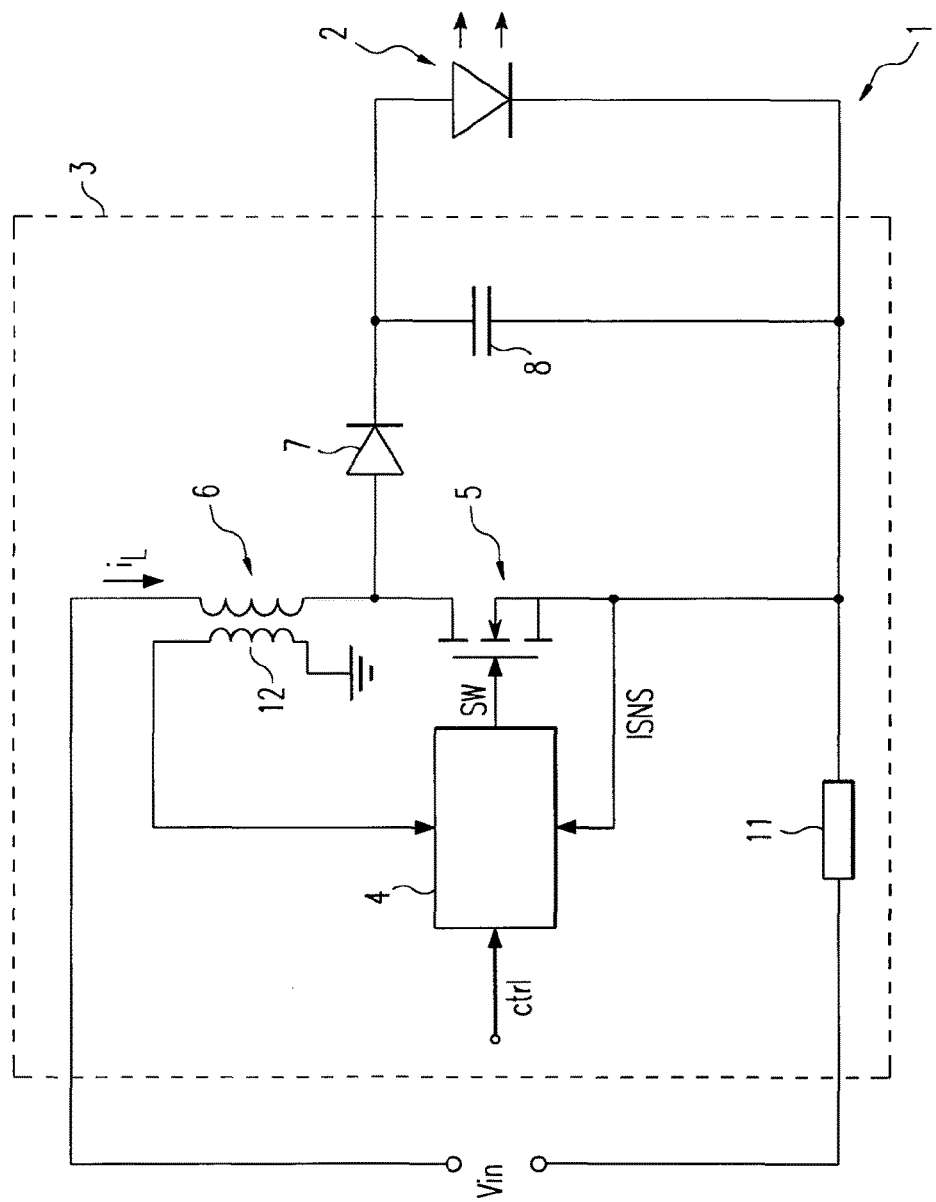
FIG. 4 shows a circuit of an operating device for light emitting diodes according to a second exemplary embodiment in accordance with the present invention.

FIG. 4 shows a circuit of an operating device 1 for lamps 2 according to a second exemplary embodiment in accordance with the present invention, comprising a switching regulator 3 having a control circuit 4 and a step-up converter serving as the converter. The coil 6, the switch 5, and the measuring resistor 11 are disposed in series between the inputs of the switching regulator 3, such that a current flows through the coil 6, switch 5 and the measuring resistor 11, when the switch 5 is switched on by the control circuit 4. The active coil current $i_L$ can be detected by the control circuit 4 during the switched on phase of the switch 5 by means of the voltage decreasing over a measuring resistor 11. The control circuit 4 compares the active coil current, or the voltage decreasing at the resistor 11 representing the coil current $i_L$ (signal ISNS), with the upper switching threshold $I_{Peak}$, and causes a switching off of the switch 5 when the increasing coil current $i_L$ reaches the upper switching threshold $I_{Peak}$ (switching-off threshold).

After switching the switch 12 off, the coil then drives a current through the diode 7 and the parallel connection comprising the capacitor 8 and the light emitting diode 14. In order to switch the switch 3 back on, the control circuit 4 compares the active coil current $i_L$, which is likewise detected by means of the measuring resistor 11, with the lower switching threshold value $I_{low}$, and causes the switch 5 to be switched on when the coil current $i_L$ reaches the lower switching threshold value $I_{low}$, in particular when the again increasing coil current $i_L$ reaches the lower switching threshold value $I_{low}$ with its rising side (low/high transition).

The point in time when the current flow through the coil 6 has decreased to zero during the switched off phase can be determined by the control circuit 4, alternatively or additionally, by means of the signal/voltage generated by the inductor 12 coupled to the coil 6.

The control of the operating device 1 shown in FIG. 4 in the limit operating mode, discontinuous operating mode, and in the alternating operating mode, can take place in a manner analogous to the control of the operating device 1 shown in FIG. 1, wherein when the current mean value through the LED is calculated, it should be taken into account that with the operating device 1 shown in FIG. 4, a supplying of the load, or a current flow through the diode 7, takes place only during the switched off phase (switched off period $T_{Off}$).

Figure 5:
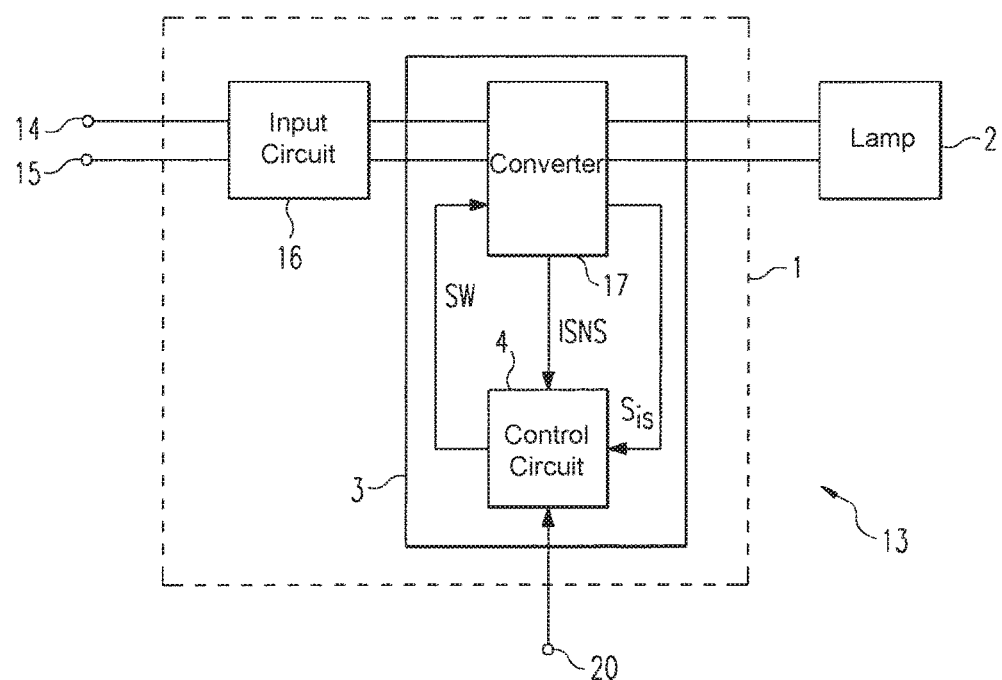
FIG. 5 shows, in a schematic illustration, a lamp with an operating device in accordance with an exemplary embodiment of the present invention.

FIG. 5 shows, in a schematic illustration, a lighting fixture 13 with a lamp 2, and an operating device 1 according to an exemplary embodiment of the present invention.

The operating device 1 of the lighting fixture 13 shown in FIG. 5 serves to operate the lamp 2 with an alternating current voltage, which can be supplied to the operating device 1 via the input connections 14 and 15. The alternating current voltage is converted in the operating device 1 into a direct current voltage, or a rectified alternating current voltage, respectively, in an input circuit 16. The input circuit 16 can comprise a power factor corrector circuit for improving the power factor. If the lighting fixture 13 is to be operated on a direct current voltage, or a direct current voltage network, a rectifier is not necessary, and the input circuit 16 can contain just means for stabilizing the input voltage, or be omitted.

The operating device 1 also has a switching regulator 3 composed of a converter 17 and the control circuit 4. The converter 17 generates an operating voltage for the lamp 2 from the voltage output by the input circuit 17 by means of an energy store and a periodically acting electronic switch controlled by the control circuit 4. The energy store can be a coil, the current flow of which increases after the switch coupled to the coil is switched on, and decreases after it has been switched off.

The dimming signal for setting the brightness of the lamp 2 can be supplied to the control circuit 4 via a signal input connection 20. A signal $S_{is}$ indicating the current flowing through the lamp 2 or the voltage output to the lamp 2, and the signal ISNS indicating the current flow through the switch and/or the energy store, is received by the control circuit 4 from the converter 17. The signal $S_{is}$ or the current output to the lamp 2 by the operating device 1 can also be determined by the control circuit by means of the signal ISNS, in particular with the use of a step-down converter.

According to one aspect of the present invention, the control circuit 4 is configured to switch off the switch coupled to the energy store, in a discontinuous operating mode, when the signal ISNS indicates that the current through the switch, or the current through the energy store, has reached a switching-off threshold set as a function of the dimming signal received by the control circuit 8, and to regulate the switching back on point in time of the switch on the basis of the signal $S_{is}$. The control circuit 4 can be configured to operate the converter 7 exclusively, i.e. at every dimming level indicated by the received dimming signal, in the discontinuous operating mode described above, or for only a certain dimming range or output load range.

Figure 6:
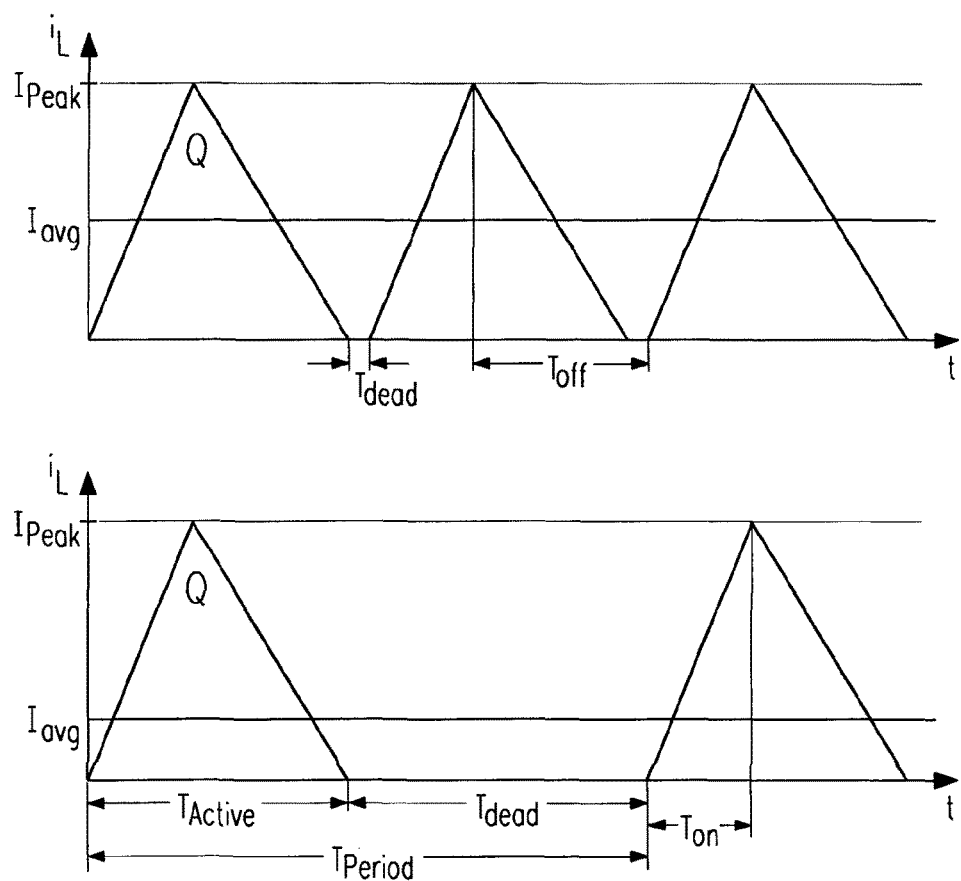
FIG. 6 shows diagrams with signal curves of the operating device shown in FIG. 5 and operated in the discontinuous operating mode.

FIG. 6 shows two diagrams having the temporal curve of the current $i_L$ flowing through the energy store having different down times $T_{dead}$ and a constant switching-off threshold $I_{Peak}$ of the operating device functioning in the discontinuous operating mode. The current flowing through the energy store increases in the diagram after the switch has been switched on. When the switching-off threshold $I_{Peak}$ has been reached, the switch is switched off, the energy store is discharged, and the current drops to zero. After the down time $T_{dead}$ set by the control circuit 4 has elapsed, the switch is switched on again. The timespans $T_{On}$, $T_{Off}$, $T_{Active}$, $T_{dead}$ are the switched on period of the switch, the switched off period of the switch, the current flow period through the energy store, and the switching cycle period. The value $I_{avg}$ is the mean current through the energy store in the illustrated curves, and a measure for the power supplied by the converter of the operating device 1 to the lamp 2. As can be seen in the diagrams in FIG. 6, the mean current value $I_{avg}$ decreases when the switching-off threshold $I_{Peak}$ remains constant, and the down time $T_{dead}$ increases.

The switching-off threshold $I_{Peak}$ can be set by the control circuit 4 by means of a table or a function, which assigns a specific threshold value to each value of the received dimming signal. The table or function can be selected from numerous stored tables/functions by the operator and/or manufacturer, e.g. in accordance with the load that is to be operated and/or the dimming requirements. If the control circuit 4 is capable of determining the load requirements itself (e.g. the type of lamp), the table or function can be automatically selected by the control circuit 4 on the basis of such a determination.

With the set switching-off threshold $I_{Peak}$, a stabilizing/regulating of the power output of the converter 17 determined by means of the signal $S_{is}$ takes place by means of the control circuit 4 when in operation, through an adjustment of the down time $T_{dead}$, i.e. the timespan between the time starting when the energy store no longer discharges and the time at which the switch is switched back on, or the energy store is charged again.

If the power output determined by means of the signal $S_{is}$ decreases due to temperature or voltage fluctuations while the dimming signal/dimming value remains constant, the control circuit 4 shortens the down time $T_{dead}$, in order to compensate for the power decrease, or to counteract it.

In contrast, when the power output increases while the dimming signal/dimming value remains constant, the down time $T_{dead}$ is increased by the control circuit 4. In order to decrease or increase the down time $T_{dead}$, a switching back on of the switch takes place at an earlier or later time, respectively, by means of which the duration/period $T_{Period}$ of a switching cycle is shortened or increased, respectively. The changing/adjustment of the dead time $T_{dead}$ by the control circuit 4 resembles a pulse frequency modulation PFM, requiring conventional additional components/circuits.

The relationship between the change in the down time $T_{dead}$ and the change in the power output is preferably non-linear in the discontinuous operating mode. A displacement of the switching back on point in time with small down times $T_{dead}$ causes a greater change in the power output than a displacement over an identical Δt with long down times $T_{dead}$. Thus, if the down time $T_{dead}$ is modified in steps of equal size in the regulation of the power output, the response behavior of the regulation worsens with larger down times $T_{dead}$ (low power outputs), because one adjustment step with large down times $T_{dead}$ has a very small effect on the change to the power output, and numerous adjustment steps/switching cycles are therefore needed.

In order to improve the response behavior in a simple manner, the control circuit 4 according to another exemplary embodiment of the present invention can also be configured to increase the amplification factor of the regulating loop with large down times $T_{dead}$, or to increase the amplification factor for the regulation of the power output taking place via a change in the switching back on point in time in the case of an increasing down time $T_{dead}$ in successive switching cycles. When the down time $T_{dead}$ decreases in successive switching cycles, the amplification factor is reduced. A change in the amplification factor as a function of the down time $T_{dead}$ can take place over the entire down time range available during the regulation, or it can take place for just one or more specific ranges. The amplification factor has an effect on the down time $T_{dead}$ that is to be set for the next switching cycle, and can be selected such that the relationship between the change to the down time $T_{dead}$ and the change in the power output is linear. Additionally or alternatively, a change/adjustment of the switching-off threshold $I_{Peak}$ can be carried out in the regulation of the control circuit 4, at least in certain down times $T_{dead}$ that are to be set, and/or with certain (strong) load fluctuations. The aim of the use of the amplification factor is to prevent a slowing of the transient behavior in large down times $T_{dead}$.

The current down time $T_{dead}$ can be determined from the switching cycle set by the control circuit 8 or the switched off period $T_{dead}$ of the switch, and assigned a specific amplification factor by means of a table or a function. Because the down time $T_{dead}$ has an effect on the power output, the amplification factor can also be determined via the signal $S_{is}$, wherein each signal value having the set switching-off threshold value $I_{Peak}$ is assigned an amplification factor by means of one or more tables or functions.

In the exemplary embodiment described above, the control circuit 4 sets the switching-off threshold $I_{Peak}$ as a function of a dimming signal on the basis of a function or a table. With some applications or converters, it may however be advantageous to also change the down time $T_{dead}$ in addition to the switching-off threshold $I_{Peak}$, or to change just the down time $T_{dead}$ as a function of a dimming signal.

In one exemplary embodiment of the operating device according to the present invention, the change to the down time $T_{dead}$ as a function of a dimming signal while the switching-off threshold $I_{Peak}$ remains substantially constant takes place until a certain dimming value or until a certain power output, and below this dimming value or power output, the change in the switching-off threshold $I_{Peak}$ by the control circuit 4 takes place as a function of the dimming signal while the down time $T_{dead}$ remains constant, or, as described above, with a change in the down time $T_{dead}$ only for stabilizing the power output, with or without an adjustment of the amplification factor of the regulating loop.

Figure 7:
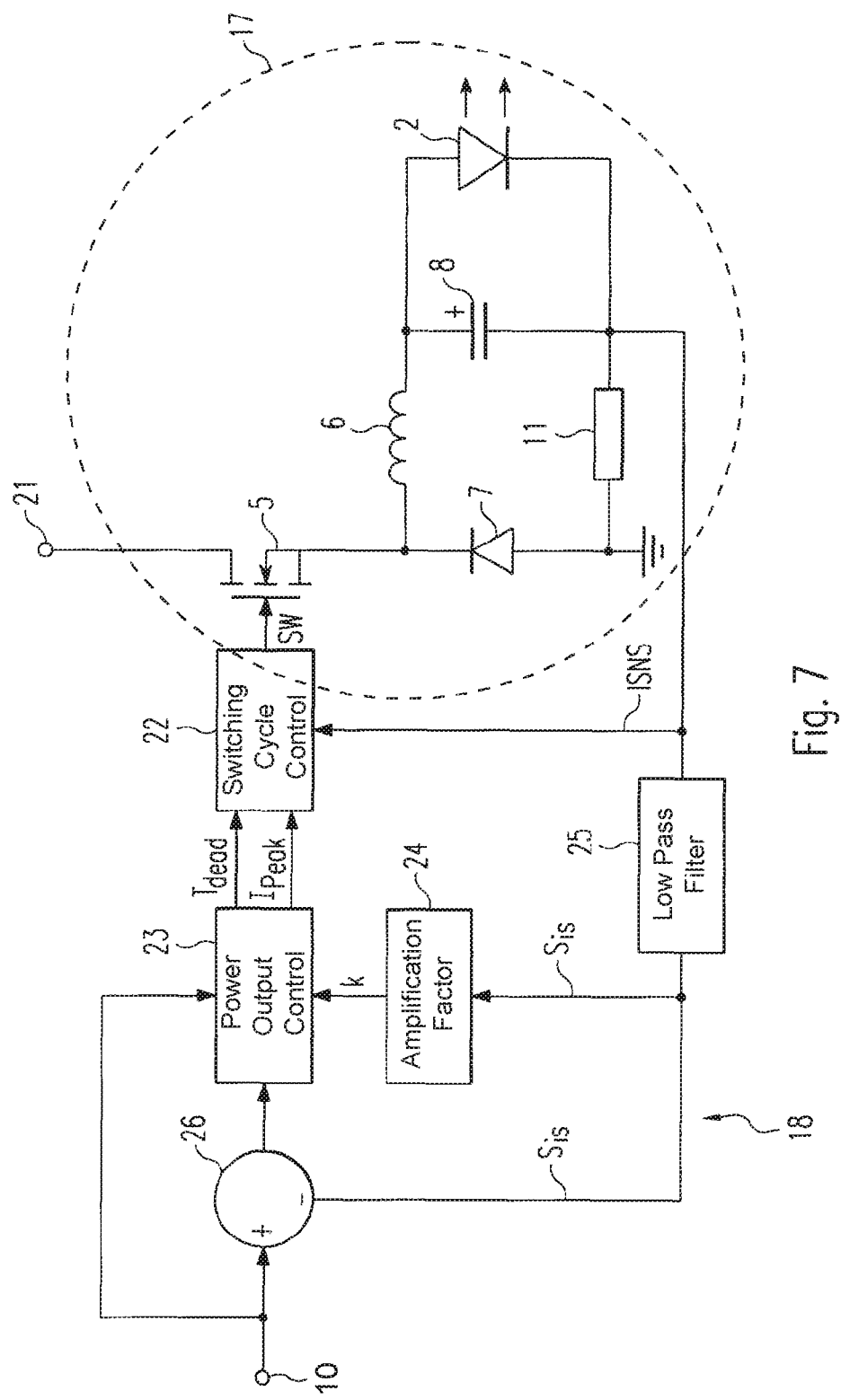
FIG. 7 shows a first exemplary embodiment of the switching regulator of the lamp shown in FIG. 5.

FIG. 7 shows a first exemplary embodiment of the switching regulator 3 shown in FIG. 5, in which the converter 17 is a step-down converter. A supply voltage can be supplied to the converter 17 at the connection 21, which can be a direct current voltage or a rectified alternating current voltage. The switch 5, coil 6, light emitting diode 2 and measuring resistor 11 are connected in series between the connection 21 and the ground of the converter 17. In the switching regulator 3 shown in FIG. 7, the light emitting diode 2 that is to be operated by the switching regulator 3 is connected directly to the converter 17. Alternatively, the switching regulator 3 can have output connections to which one or more light emitting diodes can be connected.

A capacitor 8 is disposed parallel to the light emitting diode 2, and the diode 7 connected to the switch 5 and the ground is disposed parallel to the coil 6, the capacitor 8 and the measuring resistor 11.

The control circuit 4 of the switching regulator 3 shown in FIG. 7 has a switching cycle control device 22, a power output control device 23, an amplification factor output device 24, a low pass filter 25 and a comparator 26 for comparing a signal indicating the active power output (actual value) with the dimming signal at the signal input connection 10, which indicates the target value of the power output.

If the switch 5 is switched on by the switching cycle control device 22, a current flows from the connection 21 through the switch 5, the light emitting diode 2, and the measuring resistor 11. The voltage decreasing over the measuring resistor 11 is supplied to the switching cycle control device 22 as the signal ISNS indicating the current flow through the switch 5 and the energy store (coil 6).

The switching cycle control device 22 compares the current value indicated by the signal ISNS with the switching-off threshold value $I_{Peak}$ set by the power output control device 23. If the current flow reaches the threshold value $I_{Peak}$, the switching cycle control device 22 switches the switch 5 off. After the switch 5 has been switched off, the coil 6 drives the current by means of the diode 7 through the light emitting diode 2.

If the signal ISNS indicates that the current flow has decreased to zero, the switching cycle control device 22 begins a time measurement, and compares the elapsing time with the down time $T_{dead}$ set by the power output control device 23. If the predefined down time $T_{dead}$ has elapsed, the switching cycle control device 22 switches the switch 5 back on, and the cycle begins anew with the monitoring of the current increase and the time measurement resumes after the switching off.

In one exemplary embodiment, the power output control device 23 sets the switching-off threshold $I_{Peak}$ as a function of the dimming signal present at the signal input connection 10, on the basis, for example, of a function or a table, and regulates/stabilizes the power output with the change in the down time $T_{dead}$, as described above. For this, the signal ISNS is filtered by the low pass filter 25 and supplied to the comparator 26 for comparison with the dimming signal.

The amplification factor output device 24 supplies an amplification factor k to the power output control device 23 based on the signal $S_{is}$ filtered by the low pass filter 25 indicating the current power output, which determines the down time $T_{dead}$ and the threshold value $I_{Peak}$ on the basis of the dimming signal, the regulating deviation determined by the comparator, and the amplification factor k, and supplies it to the switching cycle control device 22. A supplying thereof can only take place with a necessary change to the current down time $T_{dead}$ used by the switching cycle control device 22, or the threshold value $I_{Peak}$ currently used for the control of the switching cycle. The control of the switch 5, or the coil current through the switching cycle control device 22 represents an internal loop, and the regulation of the power output of the converter 17 through power output control device 23 represents an outer loop.

Figure 8:
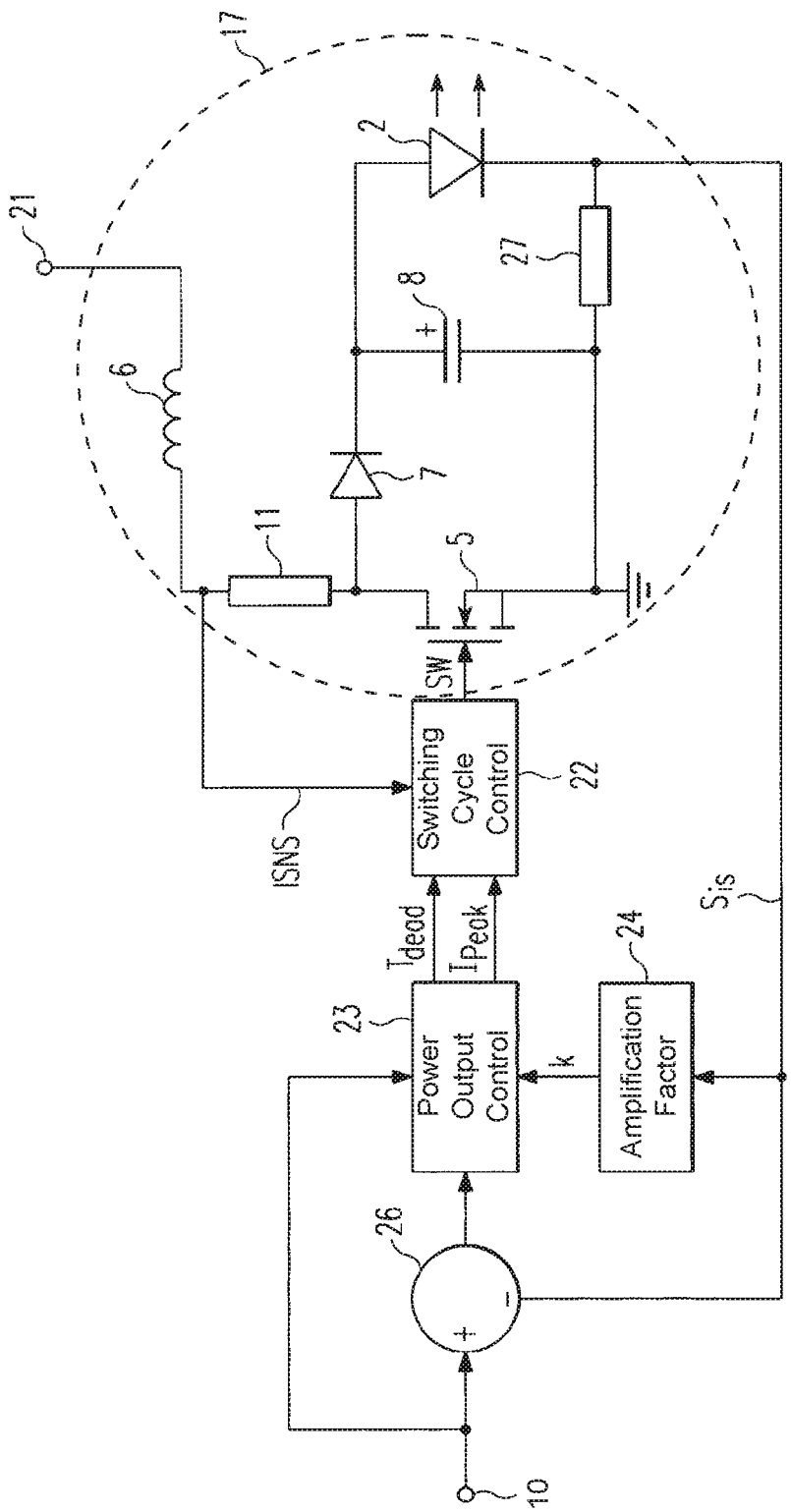
FIG. 8 shows a second exemplary embodiment of the switching regulator of the lamp shown in FIG. 5.

FIG. 8 shows a second exemplary embodiment of the switching regulator 3 shown in FIG. 5, in which the converter 17 is a step-up converter. With the switching regulator 3 shown in FIG. 8, the coil 6, the measuring resistor 11 and the switch 5 are connected in series between the connection 21 and the ground of the converter 17. The measuring resistor 11 provided for generating the signal ISNS can be disposed between the switch 5 and the ground of the converter 17, or between the connection 21 and the coil 6.

A further measuring resistor 27 for generating the signal $S_{is}$ representing the current through the light emitting diode 2 is connected to the ground of the converter 17 and the light emitting diode 2. By positioning the measuring resistor 27 between the capacitor 8 and the light emitting diode 2, the low pass filter 25 can be eliminated in this example. This measure can also be applied to the switching regulator 3 shown in FIG. 7.

The regulation of the power output by the power output control device 23 on the basis of the dimming signal, the regulating deviation determined by the comparator 26, and the amplification factor k, as well as the activation of the switch 5 by the switching cycle control device 22 on the basis of the signal ISNS and the parameters (down time $T_{dead}$ and threshold value $T_{Peak}$) set by the power output control device 23, takes place in the manner described above.

The regulation/stabilization of the power output described above, with or without correction by the amplification factor k, can also be used in the exemplary embodiments described above in which an alternating between the limit operating mode and the discontinuous operating mode takes place as a function of the switching-off threshold.

What is claimed is:

1. A switching regulator for operating one or more lamps, comprising a control circuit (4) configured to activate a switch (5) of the switching regulator (3) coupled to a coil, means (11) for direct or indirect detection of the current flowing through the coil (6) and for supplying a first signal representing this current to the control circuit (4), wherein the switch (5) is switched off when the first signal indicates that the current has reached a switching-off threshold ($I_{Peak}$), and wherein the control circuit (4) is set with a predetermined minimum value for the switching-off threshold and configured to operate the switching regulator (3), by activating the switch (5), in a limit operating mode when the load formed by the one or more lamps (2) is so high that the resulting switching-off threshold ($I_{Peak}$) lies above the predefined minimum value of the switching-off threshold ($I_{Peak}$), and in a discontinuous operating mode at the minimum value of the switching-off threshold ($I_{Peak}$) when the load formed by the one or more lamps (2) is so low that the resulting switching-off threshold ($I_{Peak}$) in a limit operating mode would lie below the predefined minimum value of the switching-off threshold ($I_{Peak}$), wherein the control circuit (4) is configured such that it activates the switch (5) in both the limit operating mode as well as in the discontinuous operating mode on the basis of the first signal, representing the current, that has been supplied; and wherein the control circuit (4) is configured to determine a current mean value $I_{avg}$ in the discontinuous operating mode for the time segment $T_{Period}$, in which the control circuit switches the switch on, off and back on, in accordance with the equation:

$$I_{avg}=0.5*I_{Peak}*T_{Active}/T_{Period},$$

wherein $I_{Peak}$ is the redefined minimum value of the switching-off threshold ($I_{Peak}$) and $T_{Active}$ is the sum of the on time $T_{On}$ and the off time $T_{Off}$ of the switch (5), and the control circuit (4) is configured to determine the point in time at which the switch (5) is switched back on in the discontinuous operating mode on the basis of the determined current mean value $I_{avg}$.

2. The switching regulator according to claim 1, wherein the control circuit (4) comprises a comparator for comparing the first signal with a signal representing the minimum value.

3. The switching regulator according to claim 1 wherein a dimming signal can be supplied to the control circuit (4) and the control circuit (4) is configured to change the switching-off threshold ($I_{Peak}$) in accordance with the dimming signal in the limit operating mode.

4. The switching regulator according to claim 1, wherein the control circuit (4) is configured to continuously determine the current mean value $I_{avg}$ in the discontinuous operating mode after the off time $T_{Off}$ of the switch (5) until the point in time at which the switch (5) is switched back on, and to continuously compare the determined current mean value $I_{avg}$ with a value corresponding to the dimming signal, in order to determine the point in time at which the switch is switched back on.

5. The switching regulator according to claim 1, wherein a signal representing the voltage curve through the switch (5) can be supplied to the control circuit (4), and the control circuit (4) is configured to determine the point in time at which the switch is switched back on in the discontinuous operating mode, on the basis of the determined current mean value ($I_{avg}$).

6. The switching regulator according to claim 1, wherein the switching regulator (3) is a step-down or step-up converter.

7. An operating device for light emitting diodes, comprising a switching regulator (3) according to claim 1.

8. A switching regulator for operating one or more lamps, comprising a control circuit (4) configured to activate a switch (5) of the switching regulator (3) coupled to a coil, means for direct or indirect detection of the current flowing through the coil (6) and for supplying a first signal representing this current to the control circuit (4), wherein the control circuit (4) is configured such that the switch (5) is switched off when the first signal indicates that the current has reached a switching-off threshold ($I_{Peak}$), and the control circuit (4) is set with a predetermined value for the switching-off threshold and configured to operate the switching regulator (3), by activating the switch (5), in a limit operating mode when the load formed by the one or more lamps (2) is so high that the resulting switching-off threshold ($I_{Peak}$) lies above the predefined minimum value of the switching-off threshold ($I_{Peak}$), and in a discontinuous operating mode at the minimum value of the switching-off threshold ($I_{Peak}$) alternating with the limit operating mode, when the load formed by the one or more lamps (2) is so low that the resulting switching-off threshold ($I_{Peak}$) in a limit operating mode would lie below the predefined minimum value of the switching-off threshold ($I_{Peak}$); and wherein the control circuit (4) is configured to determine a current mean value $I_{avg}$ in the discontinuous operating mode for the time segment $T_{Period}$, in which the control circuit switches the switch on, off and back on, in accordance with the equation:

$$I_{avg}=0.5*I_{Peak}*T_{Active}/T_{Period},$$

wherein $I_{Peak}$ is the predefined minimum value of the switching-off threshold ($I_{Peak}$) and $T_{Active}$ is the sum of the on time $T_{On}$ and the off time $T_{Off}$ of the switch (5), and the control circuit (4) is configured to determine the point in time at which the switch (5) is switched back on in the discontinuous operating mode on the basis of the determined current mean value $I_{avg}$.

9. The switching regulator according to claim 8, wherein the control circuit (4) is configured such that it activates the switch (5) in both the limit operating mode as well as in the discontinuous operating mode on the basis of the first signal, representing the current, that has been supplied.

10. The switching regulator according to claim 8, wherein the control circuit (4) is configured to change from the mode in which the switching regulator (3) is operated in the discontinuous operating mode at the minimum value of the switching-off threshold ($I_{Peak}$) alternating with the limit operating mode, to a mode in which the switching regulator (3) is operated in the discontinuous operating mode at the minimum switching-off threshold ($I_{Peak}$) not alternating with the limit operating mode, when a first control signal is received by the control circuit (4), or when the time segment $T_{Period}$, in which the control circuit (4) switches the switch (5) on, off and back on, assumes a maximum value.

11. The switching regulator according to claim 10, wherein the control circuit (4) is configured to change from the mode in which the switching regulator (3) is operated in the mode, in which the switching regulator (3) is operated in the discontinuous operating mode at the minimum value of the switching-off threshold ($I_{Peak}$) not alternating with the limit operating mode, to the mode in which the switching regulator (3) is operated in the discontinuous operating mode at the minimum value of the switching-off threshold ($I_{Peak}$) alternating with the limit operating mode, when a second control signal is received by the control circuit (4) or when the time segment $T_{Period}$, in which the control circuit (4) switches the switch (5) on, off and back on, assumes a minimum value.

12. The switching regulator according to claim 8, wherein the control circuit (4) comprises a comparator for comparing the first signal with a signal representing the minimum value.

13. The switching regulator according to claim 8, wherein the switching regulator (3) is a step-down or step-up converter.

14. An operating device for light emitting diodes, comprising a switching regulator (3) according to claim 8.

15. The switching regulator according to claim 8, wherein the control circuit (4) is configured to continuously determine the current mean value $I_{avg}$ in the discontinuous operating mode after the off time $T_{Off}$ of the switch (5) until the point in time at which the switch (5) is switched back on, and to continuously compare the determined current mean value $I_{avg}$ with a value corresponding to the dimming signal, in order to determine the point in time at which the switch is switched back on.

16. A switching regulator for operating one or more lamps, comprising a control circuit (4), which is configured to operate the switching regulator (3) in a discontinuous operating mode by means of activating a switch (5) coupled to the coil (6), means (11) for direct or indirect detection of the current flowing through the coil (6) and for supplying a first signal (ISNS) representing this current to the control circuit (4), and means (25, 27) for direct or indirect detection of the current output by the switching regulator (3) and flowing through the one or more lamps (2), or the voltage output to the one or more lamps (2), and for supplying a second signal ($S_{is}$) representing this current flowing through the lamp or voltage output to the lamp to the control circuit (4), wherein the control circuit (4) is configured to switch off the switch when the first signal (ISNS) indicates that the current has reached a switching-off threshold ($I_{Peak}$), to change the switching-off threshold ($I_{Peak}$) as a function of a received dimming signal, and to regulate the switching back on point in time of the switch (5) on the basis of the second signal ($S_{is}$).

17. The switching regulator according to claim 16, wherein the control circuit (4) is configured to set the switching-off threshold in accordance with a function or a table, which assigns a switching-off threshold ($I_{Peak}$) to each value of the received dimming signal.

18. The switching regulator according to claim 16, wherein the control circuit (4) is configured to change the switching back on point in time of the switch (5) as a function of a received dimming signal.

19. The switching regulator according to claim 18, wherein the control circuit (4) is configured to change the switching back on point in time of the switch (5) when the received dimming signal has changed at a constant switching-off threshold ($I_{Peak}$), and below the determined value, to change the switching-off threshold ($I_{Peak}$) when the off timespan of the switch (5) is constant, or when the time segment, in which the current through the coil (6) decreases to zero and the switch (5) is switched back on, remains constant.

20. The switching regulator according to claim 16, wherein the switching regulator (3) is a step-down or step-up converter.

21. An operating device for light emitting diodes, comprising a switching regulator (3) according to claim 16.

22. A method for controlling a switching regulator for the operation of one or more lamps, comprising the steps:

setting a control circuit with a switching-off threshold ($I_{Peak}$) corresponding to values of received dimming signals, including a predetermined minimum value for the switching-off threshold;

activation of a switch (5) of the switching regulator (3) coupled to a coil (6), and detection of the current flowing through the coil (6) and generation of a signal (ISNS) representing this current, wherein the switch (5) is switched off when the signal (ISNS) indicates that the current has reached the switching-off threshold ($I_{Peak}$) correlated to the respective dimming signal, wherein, by activating the switch (5), the switching regulator (3) is operated in a limit operating mode when the load formed by the one or more lamps (2) is so high that the resulting switching-off threshold ($I_{Peak}$) lies above the predefined minimum value of the switching-off threshold ($I_{Peak}$), and operated in a discontinuous operating mode at the minimum value of the switching-off threshold ($I_{Peak}$) alternating with the limit operating mode, when the load formed by the one or more lamps (2) is so low that the resulting switching-off threshold ($I_{Peak}$) in a limit operating mode would lie below the predefined minimum value of the switching-off threshold ($I_{Peak}$); and wherein the control circuit (4) is configured to determine a current mean value $I_{avg}$ in the discontinuous operating mode for the time segment $T_{Period}$, in which the control circuit switches the switch on, off and back on, in accordance with the equation:

$$I_{avg}=0.5*I_{Peak}*T_{Active}/T_{Period},$$

wherein $I_{Peak}$ is the predefined minimum value of the switching-off threshold ($I_{Peak}$) and $T_{Active}$ is the sum of the on time $T_{On}$ and the off time $T_{Off}$ of the switch (5), and the control circuit (4) is configured to determine the point in time at which the switch (5) is switched back on in the discontinuous operating mode on the basis of the determined current mean value $I_{avg}$.

\* \* \* \* \*